United States Patent [19]

Ainsworth et al.

[11] Patent Number: 5,597,206
[45] Date of Patent: Jan. 28, 1997

[54] EASY ENTRY SEAT ADJUSTER

[75] Inventors: Dean R. Ainsworth, Columbus; Russell D. Bartling, Fremont, both of Nebr.

[73] Assignee: Douglas & Lomason Company, Farmington, Mich.

[21] Appl. No.: 550,604

[22] Filed: Oct. 31, 1995

[51] Int. Cl.$^6$ .................................................. B60N 2/02
[52] U.S. Cl. .................... 297/378.12; 297/317; 297/341; 297/344.1
[58] Field of Search .............................. 297/378.12, 317, 297/341, 344.1

[56] References Cited

U.S. PATENT DOCUMENTS

| | | |
|---|---|---|
| 3,635,525 | 1/1972 | Magyar . |
| 3,811,726 | 5/1974 | Muraishi et al. ................ 297/341 |
| 3,957,312 | 5/1976 | Bonnaud . |
| 4,065,178 | 12/1977 | Carella et al. . |
| 4,101,169 | 7/1978 | Muraishi et al. ................ 297/341 |
| 4,497,518 | 2/1985 | Nishimura et al. .............. 297/341 |
| 4,502,730 | 3/1985 | Kazaoka et al. . |
| 4,652,052 | 3/1987 | Hessler et al. ................... 297/341 |
| 4,660,886 | 4/1987 | Terada et al. . |
| 4,666,208 | 5/1987 | Tatematsu et al. .............. 297/341 |
| 4,671,571 | 6/1987 | Gionet ............................. 297/341 |
| 4,742,983 | 5/1988 | Nihii ........................... 297/341 X |
| 4,822,101 | 4/1989 | Hosoe . |
| 4,844,542 | 7/1989 | Humer ..................... 297/378.12 X |
| 4,852,846 | 8/1989 | Weier ......................... 297/341 X |
| 4,856,847 | 8/1989 | Kanai .............................. 297/341 |
| 4,909,570 | 3/1990 | Matsuhashi ..................... 297/341 |
| 5,352,570 | 10/1994 | Bauer et al. ..................... 297/341 |
| 5,390,981 | 2/1995 | Griswold . |
| 5,393,123 | 2/1995 | Hernandez et al. . |

*Primary Examiner*—Peter M. Cuomo
*Assistant Examiner*—Rodney B. White
*Attorney, Agent, or Firm*—Harness, Dickey & Pierce, P.L.C.

[57] ABSTRACT

A manually-adjustable seat assembly for use in motor vehicles is disclosed as having a manual seat adjuster equipped with a seat latch mechanism and an easy entry latch release mechanism. The seat latch mechanism can be manually shifted from a latched mode into an unlatched mode via actuation of a release handle to permit selective adjustment of the fore/aft position of the seat assembly. The east entry latch mechanism is operably connected to the seat latch mechanism and is normally maintained in a non-actuated mode. Pivotal movement of the seatback to a forwardly dumped position causes the easy entry latch release mechanism to be shifted into an actuated mode for causing the seat latch mechanism to be automatically shifted into its unlatched mode. Upon return of the seatback from its formally dumped position, the east entry latch release mechanism is maintained in this non-actuated mode until the seat assembly is slid rearwardly to a predetermined memory position. At this memory position, the easy entry latch release mechanism is automatically shifted back into its non-actuated mode for shifting seat latch mechanism back into its latched mode. Thus, the seat assembly is releasably latched in the memory position.

1 Claim, 7 Drawing Sheets

1
EASY ENTRY SEAT ADJUSTER

BACKGROUND OF THE INVENTION

The present invention is generally related to manually-adjustable vehicular seats and, more particularly, to a manual seat adjuster equipped with an easy entry latch release mechanism that is operable to relatch the vehicle seat at a predetermined memory position.

Virtually all modern motor vehicles are equipped with front seats that can be selectively adjusted for providing increased comfort and convenience to the seat occupant. At a minimum, most front seats include a two-way seat adjuster that can be selectively actuated by the seat occupant for adjusting the longitudinal (i.e., "fore" and "aft") position of the seat. In most manually-adjustable seats, the two-way seat adjuster includes a pair of laterally-spaced slide assemblies, with each slide assembly having a lower track rigidly secured to the vehicle's floor structure and a carriage mounted to the vehicle seat that is supported for longitudinal sliding movement on the lower track. Moreover, such two-way seat adjusters also include a seat latch mechanism which normally operates in a latched mode for releasably locking at least one of the carriages to its corresponding lower track, thereby inhibiting longitudinal movement of the vehicle seat. A release handle permits the seat occupant to deliberately shift the seat latch mechanism out of its latched mode and into an unlatched mode for permitting selective fore/aft adjustment of the vehicle seat. As is also common, most two-way seat adjusters include a biasing mechanism for normally urging the carriages (and the vehicle seat) to their forwardmost longitudinal position on the lower tracks. Exemplary seat adjusters are disclosed in commonly-owned U.S. Pat. Nos. 5,207,480, 5,286,076, 5,322,348 and 5,383,640.

To provide increased access to the rear seating area in two door motor vehicles, many front seats are also equipped with a seatback dump apparatus and a walk-in or "easy entry" latch release mechanism. Conventionally, the seatback dump apparatus supports the seatback for pivotal movement relative to the seat bottom and includes a seatback latch mechanism that is normally operable in a locked mode for releasably retaining the seatback in an upright position relative to the seat bottom. A separate release handle is provided for selectively shifting the seatback latch mechanism from its locked mode into a released mode, whereby the seatback can be subsequently pivoted forwardly from the upright position to a dumped position. Most commonly, the easy entry latch release mechanism is arranged to operably interconnect the seatback latch mechanism to the seat latch mechanism such that pivotal movement of the seatback toward its forwardly dumped position causes the seat latch mechanism to be automatically shifted from its latched mode into its unlatched mode. Thereafter, the biasing mechanism urges the front seat to slide to its forwardmost position on the lower tracks. When the seatback is returned to its upright position, the easy entry latch release mechanism causes the seat latch mechanism to be shifted back into its latched mode in response to the seatback latch mechanism being returned to its locked mode.

While vehicular seats equipped with a seatback dump apparatus and an easy entry latch release mechanism offer the advantage of enhanced access to the rear seating area, in some instances, their usage results in other convenience features being directly compromised. In particular, it is often required that the longitudinal position of the seat be re-

2 adjusted following return of the seatback to its upright position due to the seat latch mechanism shifting back into its latched mode when the vehicle seat is located in its forwardmost position. To alleviate this inconvenience, a plethora of memory devices have been developed which function to return the vehicle seat to the last longitudinally-adjusted position it had prior to actuation of the easy entry latch release mechanism. However, most memory arrangements are extremely complicated and expensive due to the numerous components required. Accordingly, there is a continuing need to develop alternatives to such memory devices which afford practical levels of convenience and comfort while concomitantly reducing the overall cost and complexity of the vehicle seat.

SUMMARY OF THE INVENTION

It is therefore an object of the present invention to provide a manual seat adjuster for use in vehicular seating application which includes an easy entry latch release mechanism that is operable for relatching the vehicle seat in a predetermined memory position.

As a related object, the manual seat adjuster of the present invention is particularly adapted for use in vehicle seats that are equipped with a seatback dump apparatus for actuating the easy entry latch release mechanism in response to the seatback being pivoted to its fully forward dump position.

Accordingly, the present invention is directed to a manually-adjustable seat assembly for use in motor vehicles which finds particular applicability when used as a front seat. More specifically, a unique construction is disclosed for a manual seat adjuster that is equipped with a seat latch mechanism and a walk-in or "easy entry" latch release mechanism. The seat latch mechanism can be manually shifted out of its normally latched mode and into its unlatched mode via the seat occupant actuating a release handle to permit selective adjustment of the fore/aft position of the seat assembly. The easy entry latch release mechanism is operably connected to the seat latch mechanism and is normally maintained in a non-actuated mode for permitting independent fore/aft adjustment of the seat assembly via manual control of the seat latch mechanism. However, pivotal movement of the seatback to its forwardly dumped position causes the easy entry latch release mechanism to be shifted out of its non-actuated mode and into its actuated mode which, in turn, causes the seat latch mechanism to be automatically shifted out of its latched mode and into its unlatched mode. With the seat latch mechanism operating in its unlatched mode, a spring biasing mechanism is permitted to forcibly urge the seat assembly to slide towards its forwardmost position. Upon return of the seatback from its forwardly dumped position to its upright use position, the easy entry latch release mechanism is maintained in its non-actuated mode until the seat assembly is slid rearwardly to a predetermined memory position. At this memory position, the easy entry latch release mechanism is automatically shifted out of its actuated mode and back into its non-actuated mode which, in turn, causes the seat latch mechanism to shift from its unlatched mode into its latched mode. In this manner, the seat assembly is releasably locked in a predetermined memory position. The predetermined memory position is preferably located to duplicate the longitudinally-adjusted position most commonly selected by a majority of the seat occupants.

DETAILED DESCRIPTION OF THE INVENTION

While a presently preferred embodiment is hereafter disclosed for the purpose of setting forth the best mode now contemplated for carrying out the invention, it will be understood that components, devices, mechanisms, etc., of equivalent structure and/or function to those hereinafter described are within the fair scope of this invention.

With reference to the drawings, an exemplary motor vehicle seat assembly 10 is shown to include a seatback 12 that is supported for pivotal movement relative to a seat bottom 14. According to the particular embodiment shown, seat assembly 10 is illustrated as the front passenger-side seat of the type well-suited for use in two-door motor vehicles. To provide means for permitting selective pivotal movement of seatback 12 relative to seat bottom 14, a seatback recliner/dump apparatus 16 is provided along the outboard lateral edge of seat assembly 10. Recliner/dump apparatus 16 includes a seatback latch mechanism 18 that is normally operable in a locked mode for preventing pivotal movement of seatback 12 relative to seat bottom 14. However, seatback latch mechanism 18 is also operable in a released mode for permitting selective "reclining" movement of seatback 12 relative to seat bottom 14 between an upright position (shown in FIGS. 1 and 2) and a plurality of rearwardly tilted positions. The seat occupant must exert rearward pressure on seatback 12 to cause reclining movement thereof to one of its rearwardly tilted positions when seatback latch mechanism 18 is in its released mode.

Recliner/dump apparatus 16 is also operable when seatback latch mechanism 18 is in its released mode to permit forward pivotal movement of seatback 12 toward a forwardly dumped position. A recliner handle 20 is located adjacent to the outboard edge of seat bottom 14 and is operably coupled to seatback latch mechanism 18 for permitting the seat occupant to selectively shift seatback latch mechanism 18 out of its locked mode and into its released mode.

In addition, a dump handle 22 is provided adjacent to the outboard edge of seatback 12 and is coupled to seatback latch mechanism 18 via a suitable coupling device, such as a cable assembly 24. As will be detailed, manual actuation of dump handle 22 functions to shift seatback latch mechanism 18 of recliner/dump apparatus 16 into its released mode, thereby permitting seatback 12 to be forwardly pivoted to its dumped position to provide increased access to the rear seating area behind seat assembly 10. While the particular construction of recliner/dump apparatus 16 is not critical to the novelty of this invention, various components thereof will hereinafter be described to illustrate the operable association thereof with the unique features of the present invention.

Figure 1:
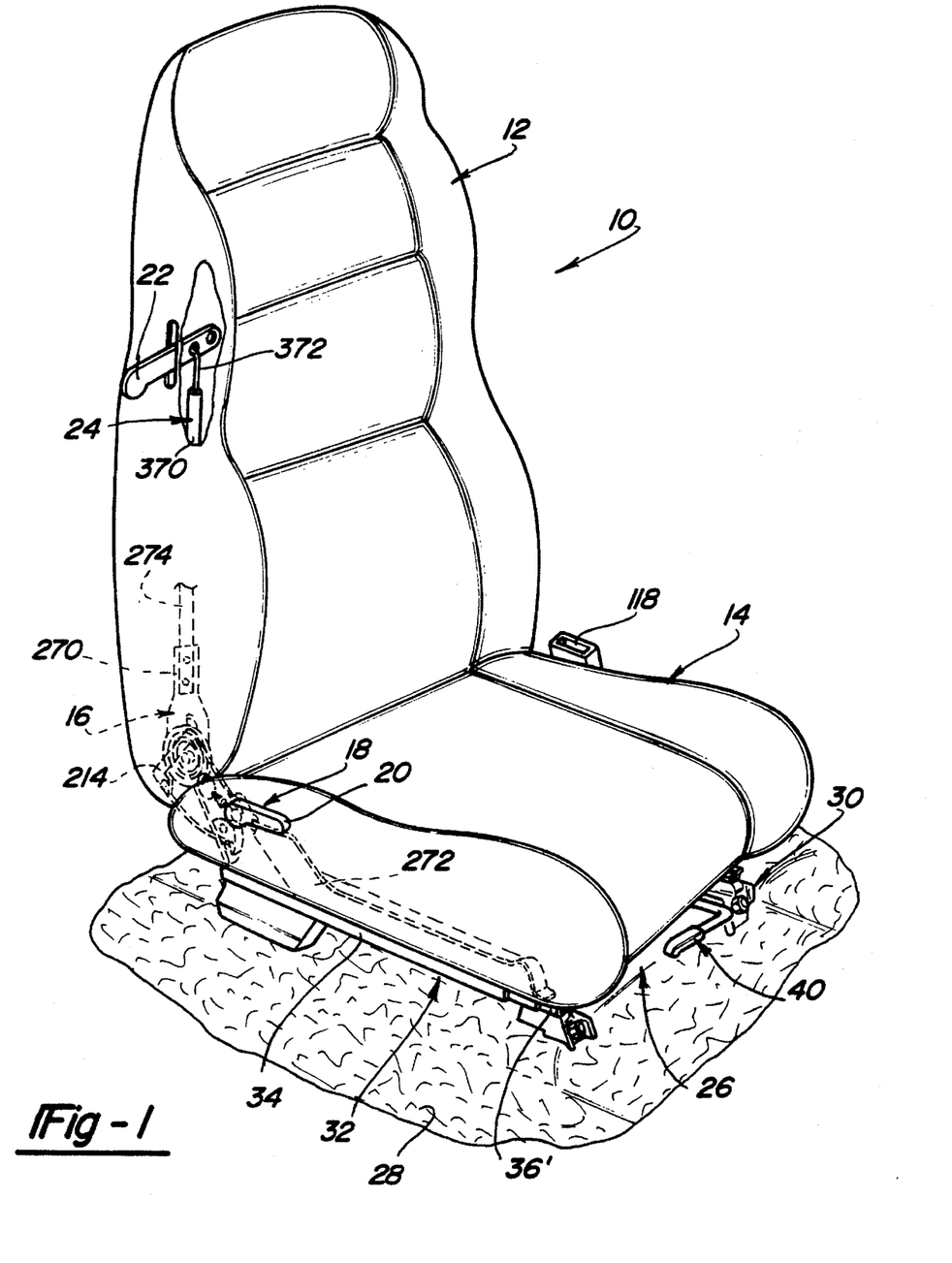
FIG. 1 is a perspective view of an exemplary motor vehicle seat assembly equipped with the manual seat adjuster of the present invention.
Figure 2:
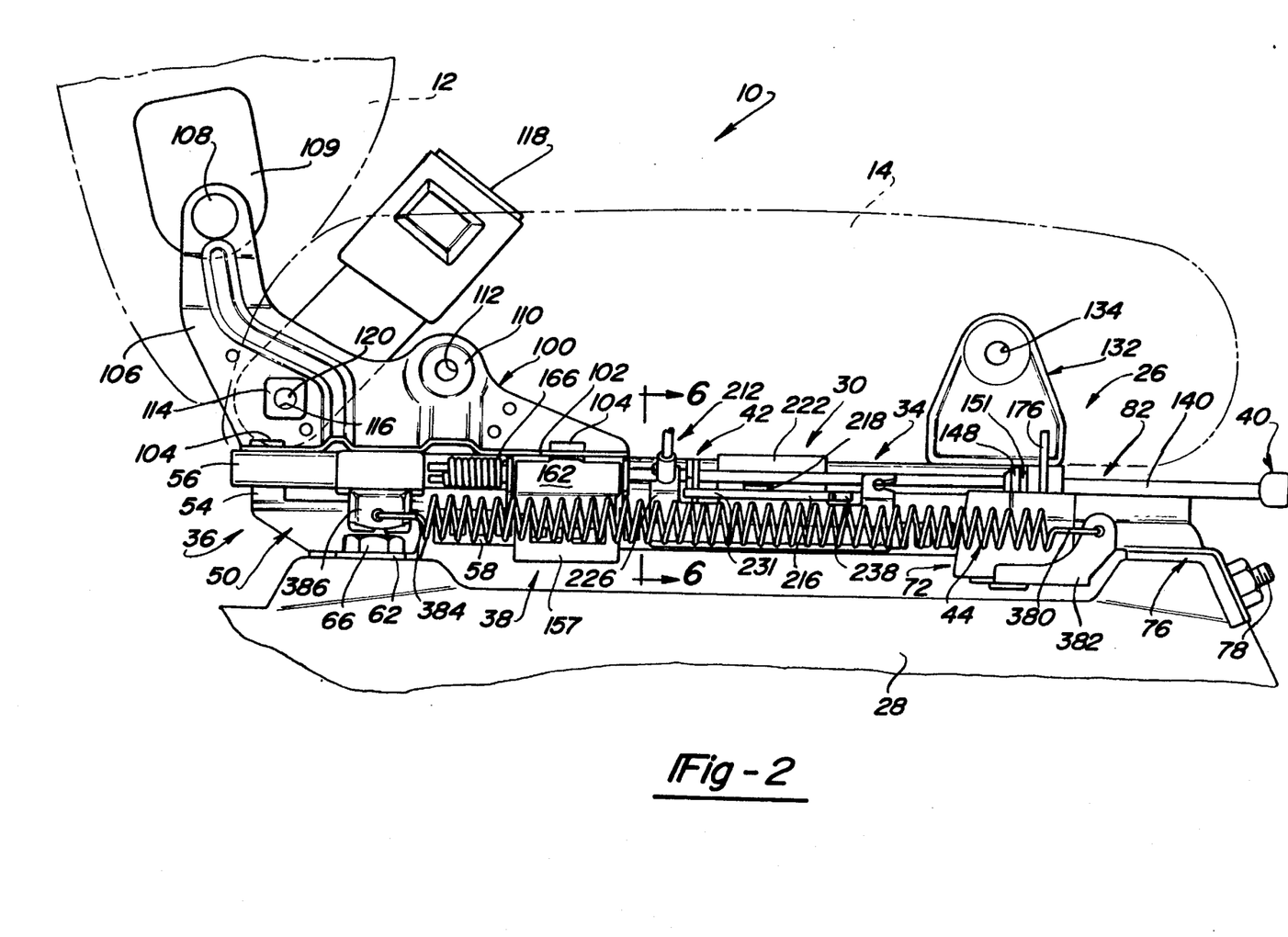
FIG. 2 is a side elevational view of a slide assembly associated with the manual seat adjuster of the present invention and with portions of the seat assembly shown in phantom for the purpose of illustration.
Figure 3:
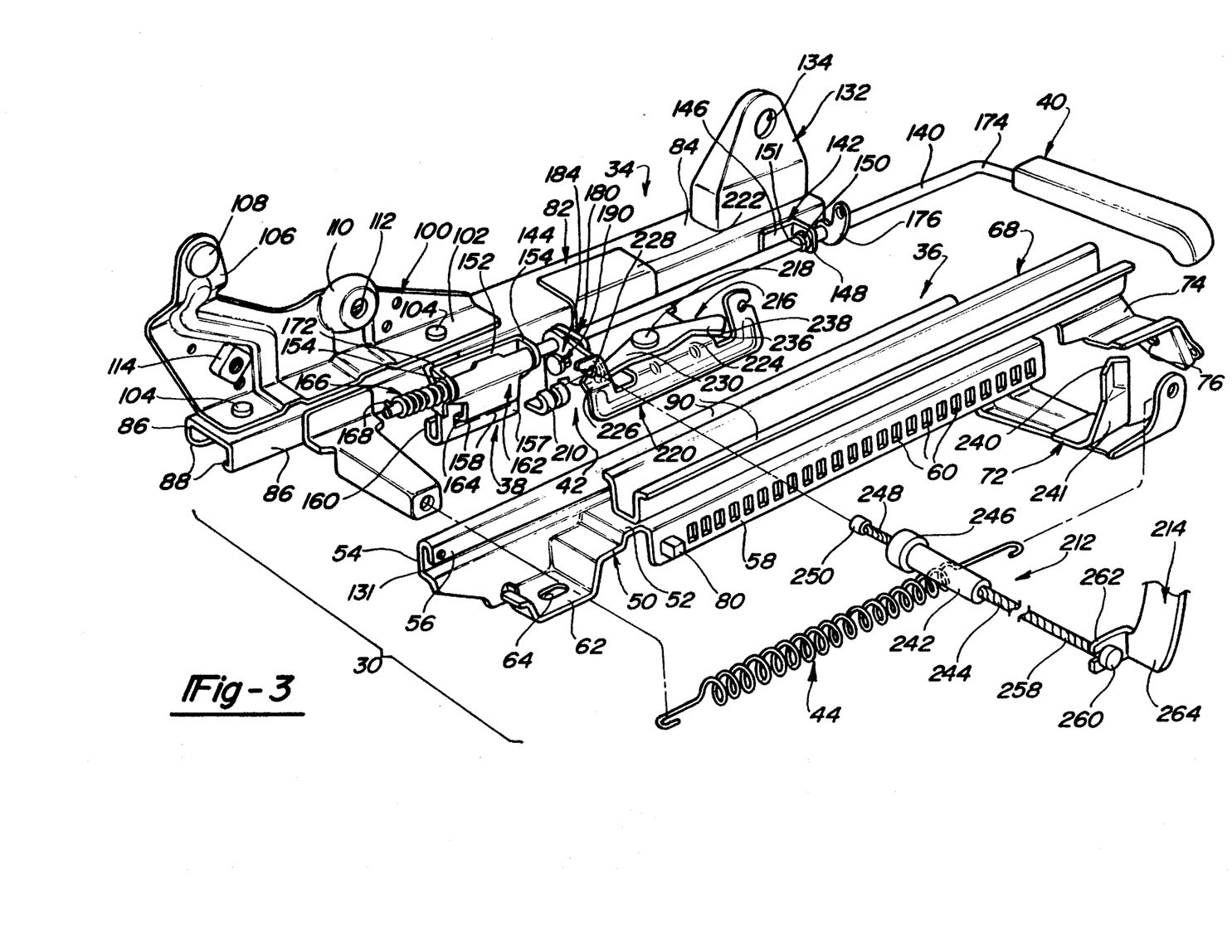
FIG. 3 is a partially exploded perspective view of the seat slide assembly showing the components associated with its seat latch mechanism and easy entry latch release mechanism in greater detail.
Figure 4:
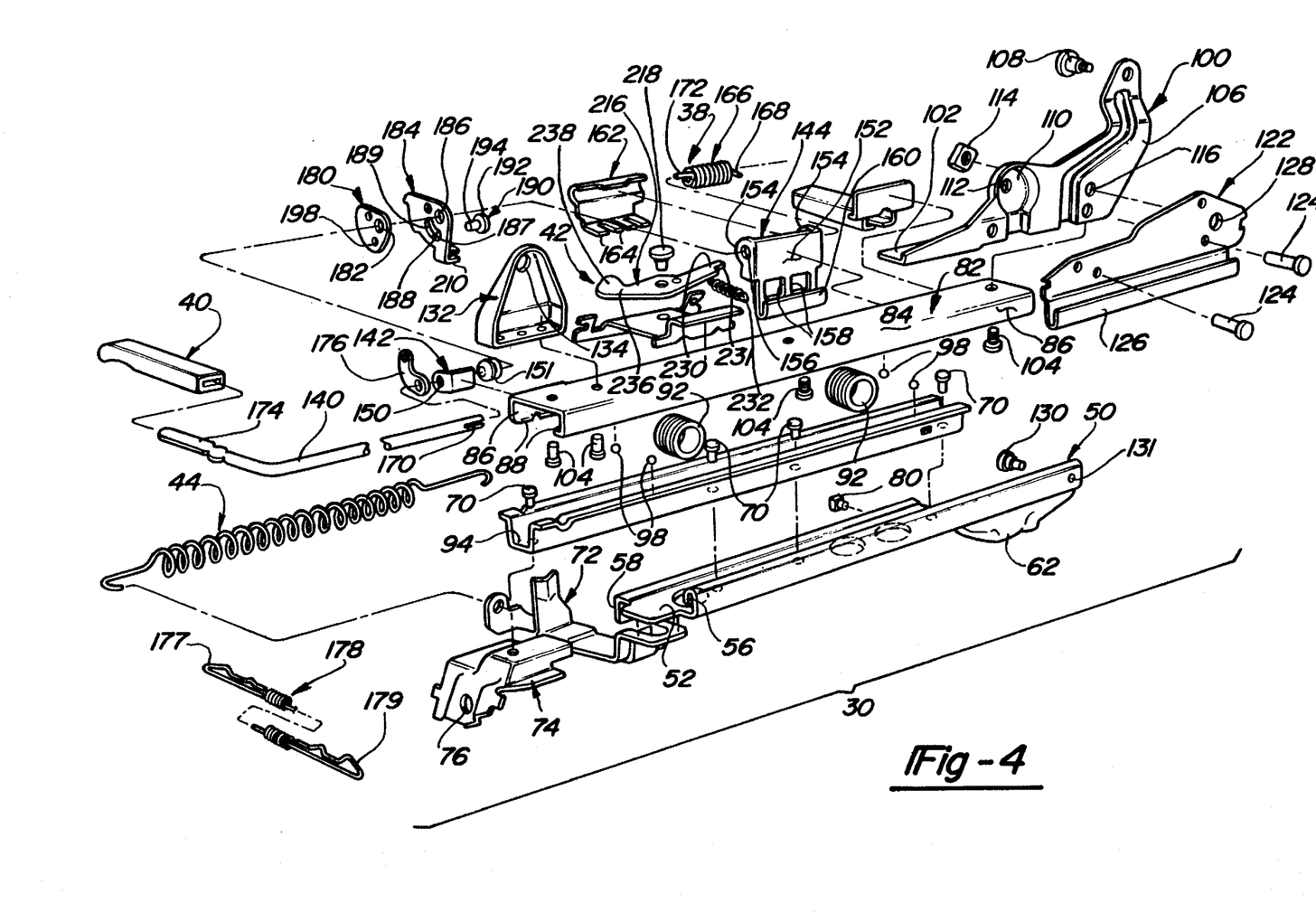
FIG. 4 is a fully exploded perspective view of the seat slide assembly shown in FIG. 3.

Seat assembly 10 includes a manual seat adjuster 26 for permitting two-way (i.e., fore and aft) longitudinal adjustment of seat assembly 10 with respect to the motor vehicle's floor structure 28 and which includes a pair of laterally-spaced slide assemblies 30 and 32. Slide assembly 30 includes an upper rail assembly 34 that is supported for sliding movement on a lower rail assembly 36. As such, the inboard portion of the seatpan frame (not shown) associated with seat bottom 14 is secured to upper rail assembly 34 for movement therewith while lower rail assembly 36 is securely fixed to floor structure 28. Slide assembly 30 also includes a manually-operable seat latch mechanism 38 that is normally operable in a latched mode for releasably locking upper rail assembly 34 to lower rail assembly 36. Seat latch mechanism 38 can be manually shifted out of the latched mode and into an unlatched mode via the seat occupant actuating a release handle 40, whereby upper rail assembly 34 is released for fore and aft sliding movement on lower rail assembly 36.

According to the present invention, slide assembly 30 of seat adjuster 26 is also equipped with a walk-in or "easy entry" latch release mechanism 42. Easy entry latch release mechanism 42 is operably connected to seat latch mechanism 38 and is normally maintained in a non-actuated mode for permitting independent fore/aft adjustment of seat assembly 10 via manual actuation of seat latch mechanism 38. However, pivotal movement of seatback 12 to its fully forward dumped position causes easy entry latch release mechanism 42 to be shifted out of its non-actuated mode and into its actuated mode. As a result of easy entry latch release mechanism 42 being shifted into its actuated mode, seat latch mechanism 38 is automatically shifted into and held in its unlatched mode. With seat latch mechanism 38 held in its unlatched mode, an assist spring 44 connected between upper rail assembly 34 and lower rail assembly 36 forcibly urges seat assembly 10 to move to its forwardmost longitudinal position, thereby providing increased access to the area rearward of seat assembly 10. As will be discussed, easy entry latch release mechanism 42 works in conjunction with recliner/dump apparatus 16 for shifting easy entry latch release mechanism 42 out of its non-actuated mode and into its actuated mode in response to seatback 12 being pivoted forwardly to its dumped position. As will also be discussed, return of easy entry latch release mechanism 42 to its non-actuated mode occurs in response to rearward sliding movement of upper rail assembly 34 past a predefined "memory" position on lower rail assembly 36 which, in turn, causes seat latch mechanism 38 to return to its normal latched mode, thereby locking upper rail assembly 34 to lower rail assembly 36.

With the exclusion of easy entry latch release mechanism 42, outboard slide assembly 32 is substantially similar in construction and function to that of inboard slide assembly 30. Specifically, slide assembly 32 includes an upper rail assembly 34' to which the outboard portion of the seatpan is fixed, and a lower rail assembly 36' fixed to floor structure 28. Upper rail assembly 34' is supported for longitudinal sliding movement on lower rail assembly 36' and a seat latch mechanism (not shown) similar to seat latch mechanism 38 is provided for releasably locking upper rail assembly 34' against movement on lower rail assembly 36'. As will be detailed, recliner/dump apparatus 16 is associated with slide assembly 32. Accordingly, in view of the acknowledged similarity between slide assemblies 30 and 32, only slide assembly 30 will be explained in detail hereinafter with reference to the drawings.

With particular reference to FIGS. 2 through 9, the components associated with slide assembly 30 will now be described. Specifically, lower rail assembly 36 is shown to include an elongated mounting bracket 50 having a horizontal base segment 52, a riser segment 54 terminating in a downturned lip 56, and a lock plate segment 58 through which a series of sequentially aligned locking apertures 60 are formed. Mounting bracket 50 is also formed to integrally include a rear mounting flange 62 having a mounting aperture 64 that is adapted to receive a suitable fastener, such as anchor bolt 66, for securing the rearward end of lower rail assembly 36 to floor structure 28. Lower rail assembly 36 also includes an elongated U-shaped track 68 that is secured to base segment 52 of mounting bracket 50 via a plurality of suitable fasteners, such as rivets 70. In addition, a trip bracket 72 associated with easy entry latch release mechanism 42 is suitably fixed (i.e., welded) to a forward underside surface of base segment 52 on mounting bracket 50. Furthermore, a foot bracket 74 is shown fixed by one or more of rivets 70 to a forward end of U-shaped track 68 and includes a mounting aperture 76 that is adapted to receive a suitable fastener, such as anchor bolt 78, for securing a forward end of lower rail assembly 36 to floor structure 28. A stop bumper 80 is fixed to the rearward end of lock plate 58 and is located so as to be potentially engagable with a portion of upper rail assembly 34 for assisting in limiting the rearward motion thereof relative to lower rail assembly 36.

With continued reference to FIGS. 2 through 9, upper rail assembly 34 is shown to include an elongated carriage 82 having a mounting segment 84, a leg segment 86 extending downwardly from each lateral edge of mounting segment 84, and an in-turned lip segment 88 formed at the terminal end of each leg segment 86. Carriage 82 is adapted to be mounted over U-shaped track 68 for sliding movement thereon such that each bent-out end flange 90 of U-shaped track 68 is aligned relative to a corresponding leg segment 86 and lip segment 88 of carriage 82. To facilitate sliding movement of carriage 82 on U-shaped track 68, a pair of cylindrical rollers 92 are mounted to roll between a base segment 94 of U-shaped track 68 and mounting segment 84 of carriage 82. In addition, two or more sets of ball bearings 98 are installed between bent-out end flanges 90 of U-shaped track 68 and turned-in lip segments 88 of carriage 82.

Upper rail assembly 34 also includes a pivot bracket 100 having a mounting flange 102 secured via rivets 104 to the rearward end portion of carriage mounting segment 84. Pivot bracket 100 also includes an upstanding riser flange 106 having a pivot post 108 pivotally supporting a seatback frame rail, partially shown at 109, that is associated with the inboard side of seatback 12 opposite to that of recliner/dump apparatus 16. Upstanding riser flange 106 also includes an embossed segment 110 having a mounting aperture 112 that is provided for accepting a suitable fastener for rigidly mounting the inboard portion of the seatpan thereto. In addition, a nut 114 is welded to surround and reinforce a mounting aperture 116 formed in upstanding riser flange 106. A belt buckle 118 is anchored via a suitable fastener 120 extending through nut 114 and mounting aperture 116. To provide structural rigidity for carrying belt buckle 118, upper rail assembly 34 further includes a reinforcement plate 122 located adjacent to riser flange 106 of pivot bracket 100 and which is fixed thereto utilizing suitable fasteners, such as rivets 124. A lower portion of reinforcement plate 122 terminates in an upturned lip 126 that extends substantially along the entire length of reinforcement plate 122. Upturned lip 126 is adapted to be slidingly retained within downturned lip 56 of mounting bracket 50. During operation of seat adjuster 26, lips 126 and 56 are not in actual contact upon sliding movement of upper rail assembly 34 relative to lower rail assembly 36. However, this interlocked arrangement is provided to absorb and transfer loading exerted on seat belt buckle 118 through slide assembly 30 to floor structure 28 of the motor vehicle. As seen, reinforcement plate 122 also has a mounting aperture 128 that is aligned with aperture 116 in pivot bracket 100. A stop rivet 130 extends through aligned apertures 131 in the rearward end of hooked lip 56 on mounting bracket 50 to assist in preventing excessive rearward movement of upper rail assembly 34 relative to lower rail assembly 36. Finally, a seat bracket 132 is mounted via rivets 104 to base segment 84 at the forward end of carriage 82. Seat bracket 132 includes a mounting aperture 134 adapted for receipt of a suitable fastener for mounting a front inboard portion of the seatpan to upper rail assembly 34.

With continuing reference to FIGS. 2 through 9, the various components associated with seat latch mechanism 38 and easy entry latch release mechanism 42 will now be described in greater detail. With respect to seat latch mechanism 38, an actuator rod 140 is mounted to carriage 82 for limited rotational movement via a pair of mounting brackets 142 and 144. Mounting bracket 142 includes a base flange 146 rigidly mounted to inner leg segment 86 of carriage 82 and a support flange 148 having an aperture 150 formed therein. A tubular collar 151 is retained within aperture 150 for journally supporting a forward portion of actuator rod 140 for rotation relative thereto. Second mounting bracket 144 has a base segment 152 that is likewise rigidly mounted to inner leg segment 86 of carriage 82. A support flange 154 extends from each lateral edge of base segment 152 and includes an aperture 156 sized to journally support a rearward portion of actuator rod 140 passing therethrough. An integral shear plate segment 157 is provided adjacent to the lower end of base segment 152 and which includes a pair of enlarged apertures 158 that are alignable with locking apertures 60 on lock plate 58. Thus, shear plate segment 157 of second mounting bracket 144 is oriented so as to be generally adjacent to and parallel with lock plate 58. Shear plate segment 157 terminates in an upturned lip 160 which is adapted to surround the lower edge of lock plate 58.

Seat latch mechanism 38 further includes a latch plate 162 that is fixed (i.e., welded) to actuator rod 140 between support flanges 154 of second mounting bracket 144. The lower end of latch plate 162 includes a series of outwardly bent and horizontally-extending lock teeth 164 arranged such that a pair thereof are aligned with each aperture 158 formed in shear plate segment 157. Lock teeth 164 are adapted to move in response to rotation of actuator rod 140 between a first position of interdigitated retention within apertures 158 in shear plate segment 157 and locking apertures 60 in lock plate 58 whereat the latched mode of seat latch mechanism 38 is established, and a second position displaced from locking apertures 60 whereat the unlatched mode of seat latch mechanism 38 is established. A biasing device, such as coil spring 166, surrounds the rearward terminal end of actuator rod 140 and has a first end 168 retained in a slot 170 formed in actuator rod 140 and a second end 172 retained against carriage 82. Thus, actuator rod 140 and release handle 40 are normally biased by coil spring 166 to rotate in a downward direction for normally urging lock teeth 164 toward the first position of interdigitation with locking apertures 60, whereat upper rail assembly 34 is inhibited from longitudinal sliding movement on lower rail assembly 36. As such, seat latch mechanism 38 is normally biased toward operation in its latched mode.

When it is desired to adjust the longitudinal position of seat assembly 10, seat latch mechanism 38 is manually actuated by the seat occupant lifting up on release handle 40 which is mounted on a bent end 174 of actuator rod 140. Such movement of release handle 40 causes actuator rod 140 and latch plate 162 to rotate in a second direction for moving lock teeth 164 from their first position to their second position in opposition to the normal biasing exerted on actuator rod 140 by coil spring 166. As noted, in this second position, lock teeth 164 are displaced from locking apertures 60 such that seat latch mechanism 38 is operating in its unlatched mode, thereby permitting the seat occupant to selectively adjust the longitudinal position of seat assembly 10 relative to floor structure 28. A link 176 is fixed (i.e., welded) to actuator rod 140 and is coupled to a first end 177 of a coupling mechanism, such as wire 178, with its other end 179 connected to a similar link that is fixed to the actuator rod of seat slide assembly 32. Thus, upward movement of release handle 40 results in the seat latch mechanisms associated with slide assemblies 30 and 32 being concurrently shifted into their unlatched modes for synchronously releasing both lateral sides of seat assembly 10 for sliding movement. However, it should be understood that in some seating applications, it may only be necessary to provide seat adjuster 26 with a latching arrangement along one lateral edge of the seat assembly (i.e., use only seat latch mechanism 38 with seat slide assembly 30).

Figure 7:
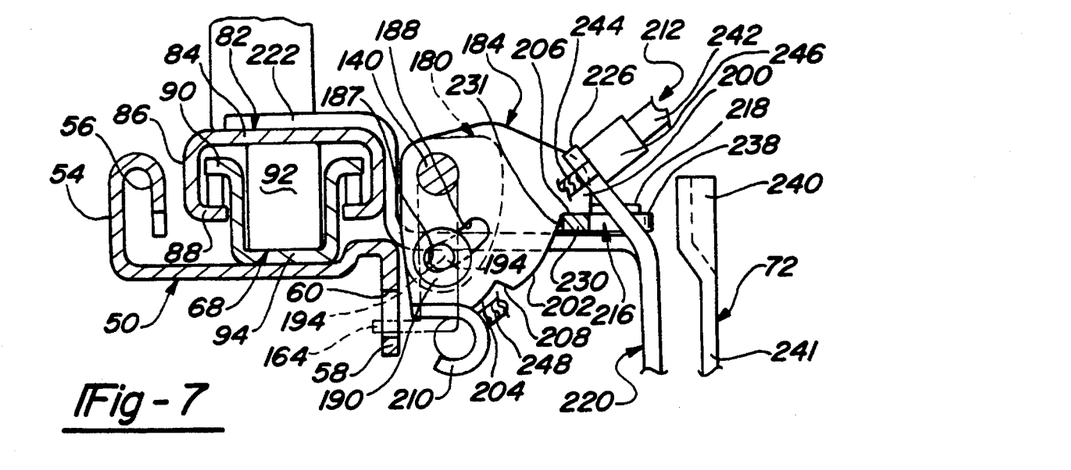
FIG. 7 is a partial sectional view taken along line 7—7 of FIG. 5.
Figure 8:
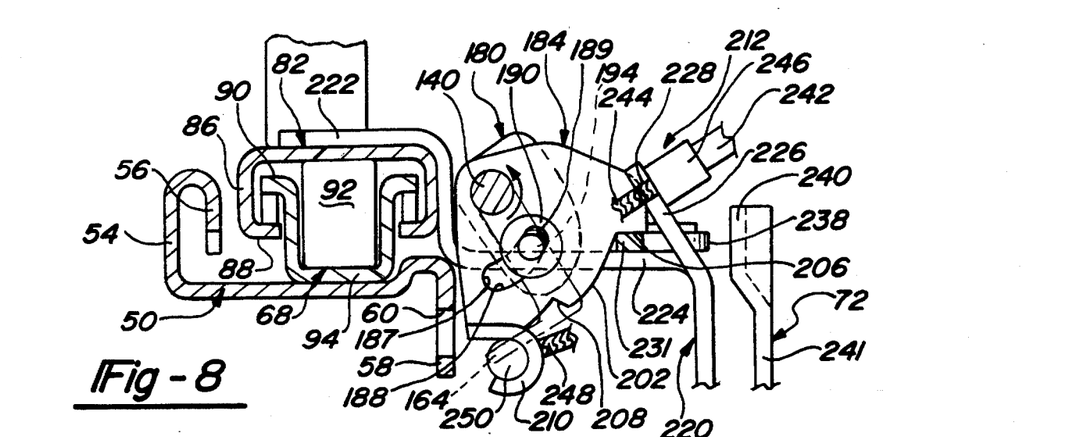
FIG. 8 is a partial sectional view similar to FIG. 7 but showing the position of the components following manual shifting of the seat latch mechanism into its unlatched mode with the easy entry latch release mechanism maintained in its non-actuated mode.
Figure 9:
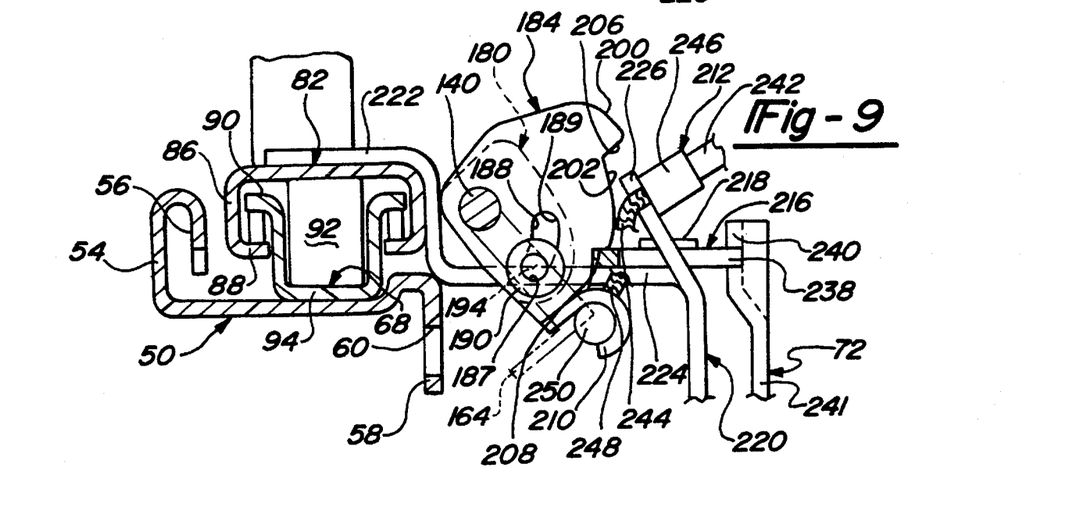
FIG. 9 is a partial sectional view taken along line 9—9 of FIG. 6.

With respect to easy entry latch release mechanism 42, its function is to automatically shift seat latch mechanism 38 out of its latched mode and into its unlatched mode in response to forward folding of seatback 12 to its forward dumped position and without manual actuation of release handle 40. To this end, easy entry latch release mechanism 42 includes an actuator cam 180 that is mounted via its aperture 182 on actuator rod 140 and fixedly secured (i.e., welded) thereto for common rotation therewith. A lock cam 184 is journally mounted via its aperture 186 on actuator rod 140 adjacent to actuator cam 180 and includes an arcuate cam slot 188 having a first end 187 and a second end 189. A follower rivet 190 has a head segment 192 located adjacent to a face surface of lock cam 184 and a post segment 194 that extends through cam slot 188 and into an aperture 198 formed in actuator cam 180. In this manner, follower rivet 190 is fixed for common rotation with actuator cam 180. As best seen in FIGS. 7 through 9, lock cam 184 has a profiled peripheral edge surface defined by a first edge segment 200, a second edge segment 202, and a third edge segment 204. As seen, a first stop shoulder 206 is formed between first and second edge segments 200 and 202, respectively, while a second stop shoulder 208 is formed between second and third edge segments 202 and 204, respectively. Lock cam 184 also includes a cable mount flange 210.

In addition to the above, easy entry latch release mechanism 42 also includes a cam lock lever 216 that is mounted via a hinge pin 218 for pivotal movement relative to a cam lock bracket 220. Cam lock bracket 220 includes a mounting segment 222 which is rigidly secured (i.e., welded) directly to carriage 82, a pivot segment 224 on which cam lock lever 216 is pivotably mounted, and a cable mount segment 226 having a slotted aperture 228 formed therein. Cam lock lever 216 includes a first leg 230 having an end segment 231 that is adapted to slide against second edge segment 202 and third edge segment 204 as well as to abut against first and second shoulders 206 and 208, respectively, during operation of easy entry latch release mechanism 42. A biasing spring 232 is fixed between cam lock bracket 220 and cam lock lever 216 for normally biasing first leg 230 in a direction toward carriage 82 to maintain abutting contact of end segment 231 with the peripheral edge surfaces of lock cam 184. A second leg 236 of cam lock lever 216 includes a bulbous protuberance defining a camming projection 238 that is adapted to selectively engage a bent-out lug 240 formed on an upstanding flange portion 241 of trip bracket 72 under the certain conditions to be described hereinafter.

Figure 10:
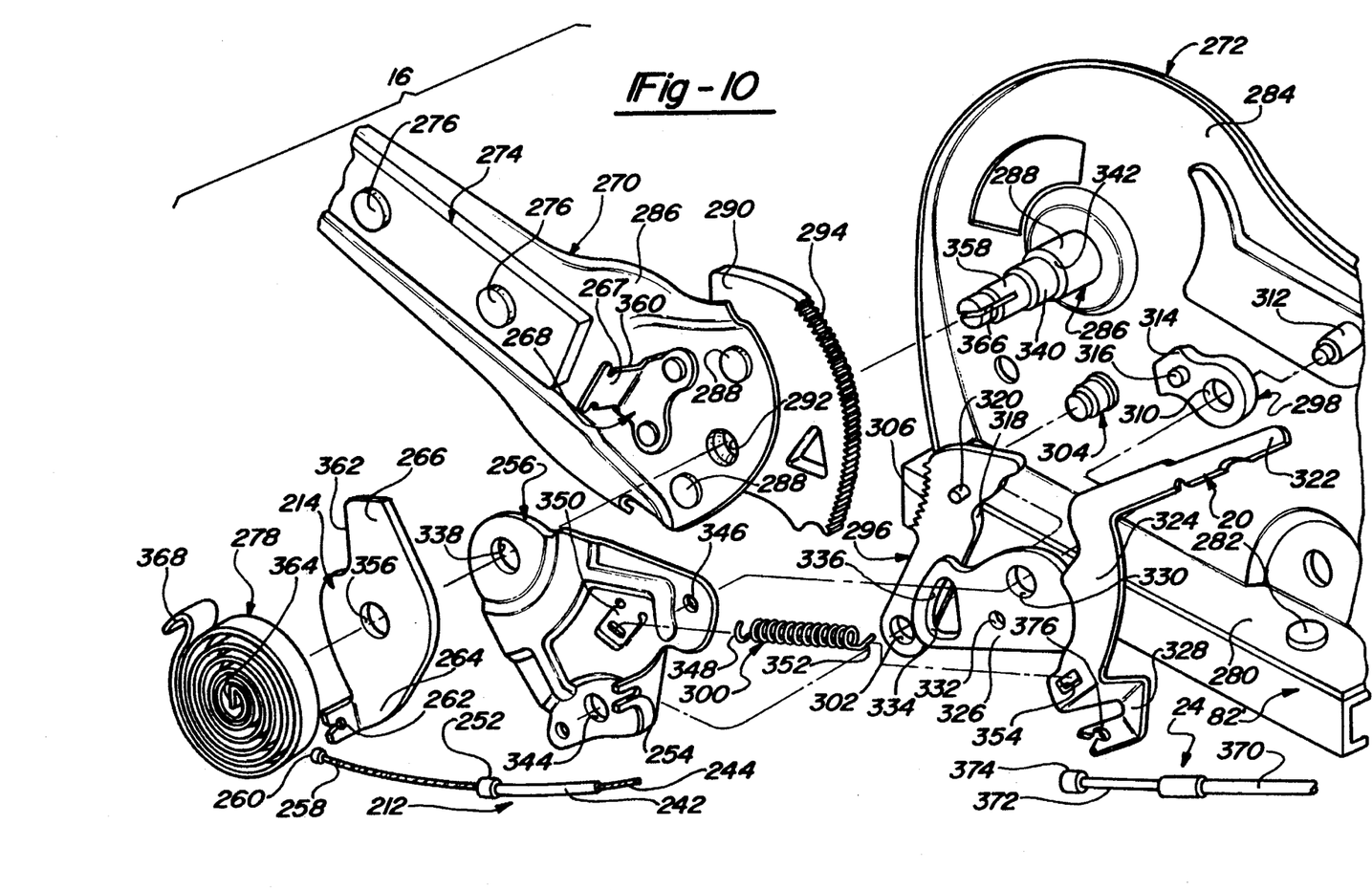
FIG. 10 is an exploded partial perspective view of a setback recliner/dump apparatus that is interconnected to the easy entry latch release mechanism of the present invention.

To provide means for interconnecting easy entry latch release mechanism 42 to recliner/dump apparatus 16, a second cable assembly 212 which interconnects lock cam 184 to a pivot lever 214. Cable assembly 212 includes a sheath 242 and an inner cable 244 retained within sheath 242 for sliding movement relative thereto. A first end 246 of sheath 242 is mounted adjacent to slotted aperture 228 in cable mount segment 226 of cam lock bracket 220. A first end portion 248 of inner cable 244 extends out of first end 246 of sheath 242 and has a ferrule 250 connected to its terminal end that is retained within cable mount flange 210 on lock cam 184. A second end 252 of sheath 242 is shown in FIG. 10 to be adapted for retention within a retainer flange 254 formed on an arm plate 256 of recliner/dump apparatus 16. Likewise, a second end portion 258 of inner cable 244 has a ferrule 260 mounted at its terminal end that is retained behind a slotted flange 262 formed on an end segment 264 of pivot lever 214. As will be detailed, an opposite end segment 266 of pivot lever 214 is arranged such that upon rotation of seatback 12 toward its forwardly dumped position, a lug 267 on a spring plate 268 attached to a seatback sector assembly 270 of recliner/dump apparatus 16 engages end segment 266 of pivot lever 214 so as to forcibly rotate pivot lever 214 in a first direction (i.e., clockwise in FIG. 10).

Referring now to FIG. 10, various components of recliner/dump apparatus 16 are shown. In general, recliner/dump apparatus 16 includes a pivot bracket 272 that is adapted to be mounted on carriage 82' of slide assembly 32, seatback sector assembly 270 mounted to a seat frame rail 274 via fasteners 276, pivot lever 214, a return spring 278, and seatback latch mechanism 18. More specifically, pivot bracket 272 includes an elongated mounting segment 280 that is fixed to carriage 82' via rivets 282 and an upstanding riser segment 284. A pivot post 286 extends from riser segment 284 and includes a first post segment 288 about which seatback sector assembly 270 is journally supported for pivotal motion relative thereto. Preferably, pivot post 286 and pivot post 108 are aligned along a common horizontal axis for supporting the opposite lateral sides of seatback 12 for concurrent pivotal movement relative to seat bottom 14. Seatback sector assembly 270 includes a seatback bracket 286 fixed via rivets 288 to a sector gear 290 such that a common aperture 292 formed therethrough is adapted to be journally supported on first pivot post segment 288. As seen, the peripheral edge of sector gear 290 is formed to include an arcuate rack Of sector teeth 294.

Seatback latch mechanism 18 includes a lock lever 296, a cam plate 298, recliner handle 20, and a biasing return spring 300. Specifically, lock lever 296 includes an aperture 302 through which a pivot pin 304 extends that is mounted to riser segment 284 of pivot bracket 272. Lock lever 296 also includes an arcuate rack of lock teeth 306. Lock lever 296 is pivotally movable between an engaged position whereat its lock teeth 306 are meshed with sector teeth 294, and a disengaged position whereat its lock teeth 306 are displaced from sector teeth 294. As will be described, lock lever 296 is normally biased by return spring 300 toward its engaged position which, in turn, biases recliner handle 20 toward its normally non-actuated position to prevent pivotal movement of seatback 12 relative to seat bottom 14, thereby defining the locked mode of seatback latch mechanism 18. As will also be detailed, upward pivotal movement of recliner handle 20 from its normally non-actuated position to its actuated position causes lock lever 296 to move from its engaged position to its disengaged position, whereby subsequent rearward reclining or forward dumping movement of seatback 12 relative to seat bottom 14 is permitted.

With continued reference to FIG. 10, cam plate 298 is shown to include an aperture 310 that is provided for journally surrounding a pivot post 312 also extending from riser segment 284 of pivot bracket 272. Cam plate 298 includes a cam tab 314 and a guide pin 316. Cam tab 314 is adapted to act against a cam surface 318 formed on lock lever 296. Lock lever 296 is also shown to include a guide pin 320 extending therefrom. Recliner handle 20 includes a handle segment 322, a central segment 324, a coupling segment 326 offset from central segment 324, and a cable mount segment 328. Coupling segment 326 includes an aperture 330 alignable with aperture 310 on cam plate 298 and which is likewise journally supported on pivot post 312. As such, recliner handle 20 is supported for pivotal movement with respect to pivot bracket 272 between its non-actuated and actuated positions. Coupling segment 326 also includes an aperture 332 arranged to retain guide pin 316 of cam plate 298 therein. As such, cam plate 298 is fixed for common rotation with recliner handle 20. Finally, coupling segment 326 includes an enlarged cam slot 334 having a cam surface 336 against which guide pin 320 on lock lever 296 is adapted to slidingly engage. Due to the interaction of cam tab 314 acting against cam surface 318 and guide pin 320 following cam surface 336, lock lever 296 is coupled to recliner handle 20 such that pivotal movement of recliner handle from its non-actuated position to its actuated position results in pivotal movement of lock lever from its engaged position to its disengaged position and vice versa.

Arm plate 256 encloses the above-noted latching components and includes an aperture 338 which journally surrounds a second post segment 340 of pivot post 286 and which is seated on shoulder 342 thereof. In addition, arm plate 256 includes apertures 344 and 346 that are respectively provided for receiving the terminal ends of pivot pin 304 and pivot post 312. In this manner, arm plate 256 is mounted for non-rotation relative to pivot bracket 272. Return spring 300 is provided for normally biasing recliner handle 20 in a downward direction for normally locating lock lever 296 in its engaged position. Return spring 300 includes a first end 348 attached to a slotted spring flange 350 extending from arm plate 256, and a second end 352 mounted in an aperture 354 formed in central segment 324 of recliner handle 20 at a position below pivot post 312. Pivot lever 214 is mounted on top of arm plate 256 and includes an aperture 356 sized for journal receipt on a third post segment 358 of pivot post 286 such that a lug edge surface 360 on spring plate 268 is aligned to selectively engage edge surface 362 on second end 266 of pivot lever 214. Finally, coiled return spring 278 is provided for normally biasing seatback 12 to pivot forwardly and which includes a first end 364 adapted to be retained within a slotted end 366 of pivot post 286 and a second end 368 adapted to abuttingly engage a portion of spring plate 268.

As seen in FIGS. 1 and 10, first cable assembly 24 interconnects dump handle 22 to recliner handle 20. In particular, first cable assembly 24 includes a sheath 370 and an inner cable 372 retained within sheath 370. A ferrule 374 is fixed to one end of inner cable 372 and is retained behind a slotted aperture 376 formed in cable mount segment 328 of recliner handle 320. The opposite end of inner cable 372 is fixed to dump handle 22 such that upward pivotal movement of dump handle 22 causes upward pivotal movement of recliner handle 20 which, due to the interaction of cam plate 298 with lock lever 296 results in lock lever 296 moving from its engaged position to its disengaged position, in opposition to the normal biasing applied thereon by return spring 300. Upon release of dump handle 22, biasing spring 300 forcibly urges recliner handle 20 to return to its non-actuated position. Thus, seatback latch mechanism 18 can be shifted out of its locked mode and into its released mode either by direct upward pivoting of recliner handle 20 or upward pivotal movement of dump handle 22 so as to permit subsequent movement of seatback 12 relative to seat bottom 14.

Figure 5:
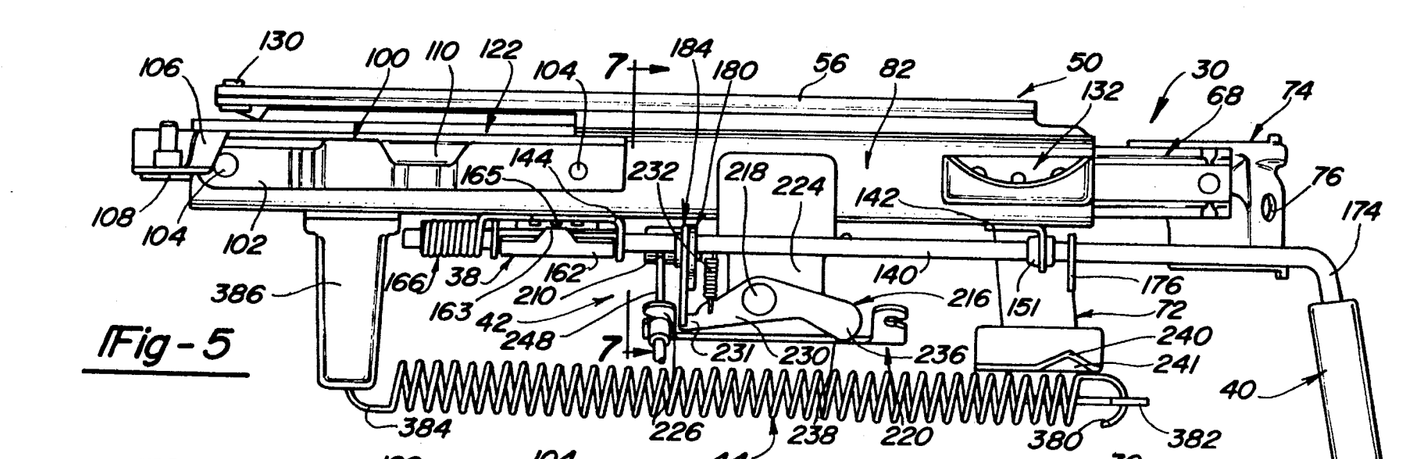
FIG. 5 is a top plan view of the seat slide assembly illustrating the seat latch mechanism in a latched mode and the easy entry latch release mechanism in a non-actuated mode.

In order to more easily and clearly describe operation of seat adjuster 26, reference can be made to FIGS. 5 through 9 for a detailed description of the different operational modes associated with seat latch mechanism 38 and easy entry latch release mechanism 42. In particular, FIGS. 5 and 7 illustrate seat latch mechanism 38 in its latched mode with easy entry latch release mechanism 42 in its non-actuated mode. More specifically, FIG. 7 illustrates locking teeth 164 of latch plate 162, shown in phantom, interdigitated within locking apertures 60 on lock plate 58 for inhibiting longitudinal sliding movement of upper rail assembly 34 on lower rail assembly 36. In addition, lock cam 184 is shown in a non-actuated position whereat end segment 231 of first leg 230 on cam lock lever 216 is biased by spring 232 into abutting engagement with first stop shoulder 206. Since biasing spring 166 normally urges actuator rod 140 to rotate downwardly, post segment 194 of follower rivet 190 is located in close proximity to first end 187 of cam slot 188 due to actuator cam 180 being fixed for rotation with actuator rod 140. As seen from FIG. 5, with first leg 230 of cam lock lever 216 biased by biasing spring 232 into engagement with second edge segment 202 of lock cam 184, second end 236 of cam lock lever 216 is positioned such that camming projection 238 is not aligned to engage lug 240 on trip bracket 72.

Upon manual release of seat latch mechanism 38 via upward rotation of release handle 40, fore and aft sliding movement of upper rail assembly 34 relative to lower rail assembly 36 is permitted without camming projection 238 engaging lug 240. In particular, FIG. 8 illustrates seat latch mechanism 38 manually shifted into its unlatched position while easy entry latch release mechanism 42 is maintained in its non-actuated mode. Specifically, locking teeth 164 of latch plate 162 are shown rotated out of interdigitated engagement with locking apertures 60 on lock plate 58 due to rotation of actuator rod 140 via manual rotation of release handle 40. During such rotation of actuator rod 140, actuator cam 180 is caused to rotate therewith such that post segment 194 of follower rivet 190 travels within cam slot 188 in a direction toward its second end 189. To prevent rotation of lock cam 184 toward its actuated position due to post segment 194 of follower rivet 190 engaging second end 189 of cam slot 188, a stop lug 163 is provided on latch plate 162 that is adapted to engage a stop lug 165 on second mounting bracket 144 when latch plate 162 is rotated to its second position whereat lock teeth 164 are released from locking apertures 60. Thus, normal manipulation of release handle 40 for shifting seat latch mechanism 38 between its normally latched and unlatched modes does not result in excessive, if any, rotation of lock cam 184. As such, manual adjustment of the longitudinal position of seat assembly 10 via normal actuation of seat latch mechanism 38 can be accomplished without movement of the components associated with easy entry latch release mechanism 42.

Figure 6:
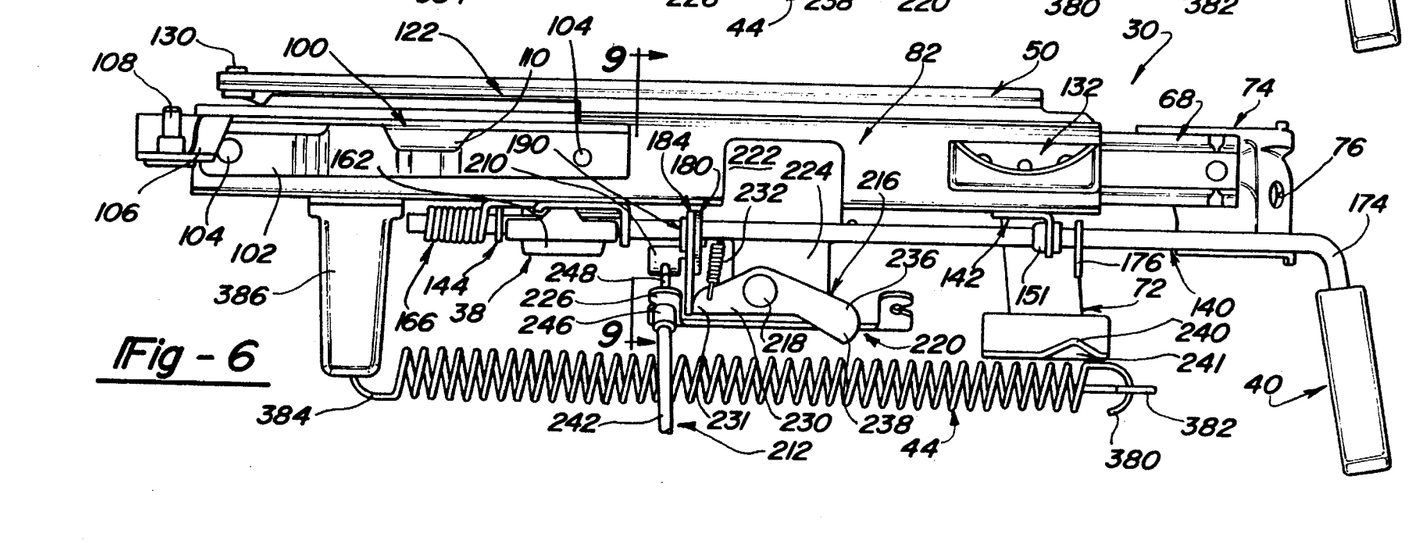
FIG. 6 is a top plan view similar to FIG. 5 illustrating the seat latch mechanism in an unlatched mode with the easy entry latch release mechanism in an actuated mode.

FIGS. 6 and 9 illustrate the condition when seatback 12 has been forwardly pivoted to its forward dumped position which causes easy entry latch release mechanism 42 to be shifted into its actuated mode which, in turn, shifts seat latch mechanism 38 automatically into its unlatched mode. Specifically, such forward pivotal movement of seatback 12 causes lug 267 on spring plate 268 to engage and forcibly rotate pivot lever 214 in the first direction and pull on inner cable 244 of cable assembly 212. Such movement of inner cable 244 results in lock cam 184 being rotated in a counterclockwise direction which, in turn, causes post segment 194 of follower rivet 190 to engage first end 187 of cam slot 188. Continued rotation of lock cam 184 causes cam actuator 180 and actuator rod 140 to be forcibly rotated, in opposition to biasing spring 166, for moving lock teeth 164 out of interdigitated retention within locking apertures 60 on lock plate 58. Moreover, the arrangement is designed such that inner cable 244 pulls sufficiently on lock cam 184 to rotate it to a position whereat end segment 231 of first leg 230 on cam lock lever 216 is biased by spring 232 to ride along second edge segment 202 until it is retained on third edge segment 204 and against second stop shoulder 208. As seen from FIG. 9, such rotation of cam lock lever 216 results in camming projection 238 on second leg 236 being positioned so as to extend past lug 240 on trip bracket 72.

With seatback 12 retained in its forward dumped position, the tension on inner cable 244 maintains lock cam 184 in its upwardly rotated position for holding lock teeth 164 away from locking apertures 60 such that upper rail assembly 34 is free to be slid forwardly to its forwardmost position on lower rail assembly 36. As upper rail assembly 34 slides forwardly, camming projection 238 will engage lug 240 such that cam lock lever 216 is pivoted momentarily to displace end segment 231 from second stop shoulder 208. However, the tension on inner cable 244 holds lock cam 184 in the rotated position shown such that end segment 231 returns to engagement with second shoulder 208 immediately upon camming projection 238 passing lug 240. Assist spring 44 is provided to assist in forcibly urging upper rail assembly 34 to move toward its forwardmost position on lower rail assembly 36 when seat latch mechanism 38 is shifted into its unlatched mode either manually (via release handle 40) or automatically (via actuation of easy entry seat latch release mechanism 42). As seen, assist spring 44 includes a first end 380 fixed to a spring retainer flange 382 on trip bracket 72, and a second end 384 fixed to a spring bracket 386 suitably mounted (i.e., riveted or welded) to carriage 82.

Once seat assembly 10 has been moved to its forward position following actuation of easy entry latch release mechanism 42, the tension on inner cable 244 can only be removed upon seatback 12 being returned from its forwardly dumped position to its upright use position. However, upon release of the tension on inner cable 244 due to seatback 12 being returned to its upright position, lock cam 184 is still maintained in its actuated position due to end segment 231 of first leg 230 on cam lock lever 216 being biased into engagement with second stop shoulder 208. Upon rearward sliding movement of upper rail assembly 34 on lower rail assembly 36, camming projection 238 on second leg 236 of cam lock lever 216 engages lug 240 on trip bracket 72. Such engagement causes cam lock lever 216 to rotate in a second direction (counterclockwise in FIG. 6), in opposition to the biasing exerted thereon by spring 232, such that end segment 231 of first leg 230 on cam lock lever 216 is released from second shoulder 208 and aligned with second edge segment 202. Concurrently with such pivotal movement of cam lock lever 216, biasing spring 166 forcibly urges actuator rod 140 and actuator cam 180 to rotate downwardly which, in turn, causes post segment 194 of follower rivet 190 to forcibly act against first end 187 of cam lock slot 188. Such action results in rotation of lock cam 184 to its non-actuated position whereat end segment 231 of first leg 230 on cam lock lever 216 again abuts first stop shoulder 206 with lock teeth 164 again interdigitated with locking apertures 60. Thus, the position at which lug 240 on lower rail assembly 36 engages camming projection 238 on upper rail assembly 34 establishes a predetermined set or "memory" position at which upper rail assembly 34 will be relatched to lower rail assembly 36 upon rearward sliding movement of seat assembly 10 following return of seatback 12 to its upright position. Preferably, this memory relatch position is selected to locate seat assembly 10 in a longitudinally-adjusted position that is most commonly selected by most seat occupants. While minor longitudinally-adjustments of the seat thereafter be made via manual manipulation of release handle 40, the present invention provides a simple and inexpensive arrangement for providing a preset memory relatch position for use with an easy entry-type seat adjuster mechanism.

The foregoing discussion discloses and describes an exemplary embodiment of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A vehicle seat assembly comprising:

a seat cushion;

a seatback mounted to a seat bottom for pivotal movement between an upright position and a forwardly folded dump position; and a manual seat adjuster having a lower rail assembly adapted to be mounted to a vehicle floor structure, an upper rail assembly supported for sliding movement on said lower rail assembly and on which said seat bottom is mounted, a latch member carried by said upper rail assembly and movable between a first position engaged with said lower rail assembly for inhibiting sliding movement of said upper rail assembly and a second position disengaged from said lower rail assembly for permitting sliding movement of said upper rail assembly, a release handle for moving said latch member from said first position to said second position, a biasing mechanism for normally biasing said latch member toward said first position, and an easy entry latch release mechanism that is operable in a non-actuated mode for permitting movement of said latch member between said first and second positions via actuation of said release handle when said seatback is in said upright position, and in an actuated mode for holding said latch member in said second position in response to pivotal movement of said seatback to said forwardly dumped position, said easy entry latch release mechanism including a stationary lug and means carried by said upper rail assembly for moving said latch member to said second position in response to rotation of said seatback to said forwardly dumped position and holding said latch member in said second position until said seatback has been returned to said upright position and said upper rail assembly has been rearwardly slid past a predetermined memory position whereat said means engages said stationary lug for releasing said latch member to return to said first position so as to latch said upper rail assembly to said lower rail assembly at said memory position.

* * * * *